United States Patent
Perez Pellitero et al.

(10) Patent No.: US 9,600,860 B2
(45) Date of Patent: Mar. 21, 2017

(54) METHOD AND DEVICE FOR PERFORMING SUPER-RESOLUTION ON AN INPUT IMAGE

(71) Applicant: THOMSON LICENSING, Issy les Moulineaux (FR)

(72) Inventors: Eduardo Perez Pellitero, Hannover (DE); Jordi Salvador Marcos, Hamburg (DE); Axel Kochale, Springe (DE)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/786,981

(22) PCT Filed: Apr. 25, 2014

(86) PCT No.: PCT/EP2014/058475
§ 371 (c)(1),
(2) Date: Oct. 25, 2015

(87) PCT Pub. No.: WO2014/174087
PCT Pub. Date: Oct. 30, 2014

(65) Prior Publication Data
US 2016/0078600 A1    Mar. 17, 2016

(30) Foreign Application Priority Data

Apr. 25, 2013    (EP) ..................... 13305547

(51) Int. Cl.
*G06K 9/00*    (2006.01)
*G06T 3/40*    (2006.01)
(Continued)

(52) U.S. Cl.
CPC .......... *G06T 3/4053* (2013.01); *G06K 9/4604* (2013.01); *G06K 9/66* (2013.01); *G06T 7/60* (2013.01)

(58) Field of Classification Search
CPC ........... G06T 3/4053; G06T 7/60; G06K 9/66; G06K 9/4604
(Continued)

(56) References Cited

U.S. PATENT DOCUMENTS

| 2012/0281923 A1* | 11/2012 | Irani | ................... G06K 9/6223 382/218 |
| 2014/0177706 A1* | 6/2014 | Fernandes | ............ H04N 19/463 375/240.03 |

OTHER PUBLICATIONS

Baker et al., "Limits on super-resolution and how to break them", IEEE Trans. on Pattern Analysis and Machine Intelligence, 24(9): pp. 1167-1183, 2002.
(Continued)

*Primary Examiner* — Ruiping Li
(74) *Attorney, Agent, or Firm* — Tutunjian & Bitetto, P.C.

(57) ABSTRACT

A method for performing super-resolution on an input image having low resolution, comprises generating a generic training data set of descriptors extracted from regions of training images, and for each patch of the input image, determining a defined number of nearest neighbor regions, extracting example patches from the nearest neighbor regions and collecting the example patches in an example patch data base, determining a combination of low-resolution example patches that, according to their descriptors, optimally approximate the current patch, and constructing a high-resolution patch, wherein a super-resolved image is obtained.

18 Claims, 5 Drawing Sheets

(51) Int. Cl.
  *G06K 9/46* (2006.01)
  *G06K 9/66* (2006.01)
  *G06T 7/60* (2006.01)
(58) Field of Classification Search
  USPC ........................................................ 382/115
  See application file for complete search history.

(56) References Cited

OTHER PUBLICATIONS

Boiman et al., "In Defense of Nearest-Neighbor Based Image Classification", Computer Vision and Pattern Recognition, 2008. CVPR 2008. IEEE Conference on, Jun. 23-28, 2008; pp. 1-8.
Chang et al., "Super-resolution through neighbor embedding", Proc. IEEE Conf. on Computer Vision and Pattern Recognition, pp. 275-282, 2004.
Farsiu et al., "Fast and robust multiframe super resolution", IEEE Trans. on Image Processing, 13(10):pp. 1327-1344, 2004.
Freeman et al., "Example-based super-resolution", IEEE Comp. Graph. Appl., 22(2):pp. 56-65, 2002.
Freeman et al; "Learning low-level vision", Int. J. Computer Vision, 40(1): pp. 25-47, 2000.
Irani et al., "Improving resolution by image registration", CVGIP: Graph. Models Image Processing, 53(3):pp. 231-239, 1991.
Keys, "Cubic convolution interpolation for digital image processing", Speech and Signal Processing, IEEE Transactions on, 29(6): pp. 1153-1160, 1981.
Lee et al., "Efficient sparse coding algorithms", pp. 801-808, 2007.
Lin et al., "Fundamental limits of reconstruction-based superresolution algorithms under local translation"; IEEE Trans. on Pattern Analysis and Machine Intelligence,26(1); pp. 83-97, 2004.
McCann et al., "Local naive bayes nearest neighbor for image classification", Computer Vision and Pattern Recognition (CVPR), 2012 IEEE Conference on Jun. 16-21, 2012; pp. 3650-3656.
Sun et al., "Image hallucination with primal sketch priors", Computer Vision and Pattern Recognition, 2003. Proceedings. 2003 IEEE Computer Society Conference on (vol. 2 ). Jun. 18-20, 2003; pp. 1-8.
Sun et al., "Image super-resolution using gradient profile prior", Computer Vision and Pattern Recognition, 2008. CVPR 2008. IEEE Conference on Jun. 23-28, 2008; pp. 1-8.
Wang et al., "Image quality assessment—from error visibility to structural similarity", Image Processing, IEEE Transactions on (vol. 13 , Issue: 4 ), Apr. 13, 2004; pp. 600-612.
Yang et al., "Image super-resolution as sparse representation of raw image patches", Computer Vision and Pattern Recognition, 2008. CVPR 2008. IEEE Conference on Jun. 23-28, 2008; pp. 1-8.
Yang et al., "Image super-resolution via sparse representation", Image Processing, IEEE Transactions on (vol. 19 , Issue: 11 ), May 18, 2010; pp. 2861-2873.
Zhang et al., "Multi-scale dictionary for single image super-resolution", Computer Vision and Pattern Recognition (CVPR), 2012 IEEE Conference on Jun. 16-21, 2012; pp. 1114-1121.
Lu et al., "Geometry constrained sparse coding for single image super-resolution" Computer Vision and Pattern Recognition (CVPR), 2012 IEEE Conference on, pp. 1648-1655, 2012.
Lowe, "Distinctive image features from scale-invariant keypoints", Int. J. Comput. Vision, 60(2):pp. 91-110, 2004.
Dai et al., "Soft edge smoothness prior for alpha channel super resolution", Computer Vision and Pattern Recognition, 2007. CVPR '07. IEEE Conference on Jun. 17-22, 2007; pp. 1-8.
Barnes et al., "PatchMatch—A Randomized Correspondence Algorithm for Structural Image Editing", ACM Trans. on Graphics, ACM, US, vol. 28, No. 3, Jul. 27, 2009, pp. 1-10.
Barnes et al., "The Generalized PatchMatch Correspondence Algorithm", Computer Vision ECCV, Sep. 5, 2010, Springer, pp. 29-43.
Bishop et al., "Super-resolution enhancement of video", Int. Workshop on artificial intelligence and statistics, No. 9th, Jan. 3, 2003, pp. 1-8.
Gao et al., "Image Super-Resolution with Sparse Neighbor Embedding", IEEE Transactions on Image Processing, vol. 21 , Issue: 7, Jul. 1, 2012; pp. 3194-3205.
Ni et al., "An adaptable k-nearest neighbors algorithm for MMSE Image Interpolation", IEEE Trans. on Image Processing, IEEE, NJ, USA, vol. 18, No. 9, Sep. 1, 2009, pp. 1976-1987.
Tang et al., "Single-image super resolution based on semi-supervised learning", IEEE Pattern Recognition, First Asian conference, Nov. 28, 2011, pp. 52-56.
Zhu et al., "Optimized image super-resolution based on sparse representation", 21st International Conference on Pattern Recognition (ICPR 2012), Nov. 11-15, 2012. pp. 1052-1055.
Search Report Dated Sep. 23, 2014.

* cited by examiner

METHOD AND DEVICE FOR PERFORMING SUPER-RESOLUTION ON AN INPUT IMAGE

This application claims the benefit, under 35 U.S.C. §365 of International Application PCT/EP2014/058475, filed Apr. 25, 2014, which was published in accordance with PCT Article 21(2) on Oct 30, 2014 in English and which claims the benefit of European provisional patent application No. 13305547.5, filed Apr. 25, 2013.

FIELD OF THE INVENTION

This invention relates to a method for performing super-resolution on an input image, and a device for performing super-resolution on an input image.

BACKGROUND

Example- or learning-based super-resolution (SR) methods predict high-frequency (HF) image details of a low-resolution (LR) image from a training data set. A relation between patches of an input image and the training data set of the dictionary is determined, and corresponding high-resolution (HR) patches from the dictionary are used to synthesize the HR patches for the input image.

Neighbor embedding (NE)-based algorithms estimate HR patches by linearly combining the HR counterparts of neighbors found in the LR domain. Such NE-based algorithms are known to be more generally usable, so that even with relatively small training data sets good results can be achieved. Sparse super-resolution uses a one-time trained dictionary, which is generic for several or all images and that is trained with natural images. "Sparse" means inter alia that only few, not all, of the dictionary entries are actually used for HR patch construction, and these can be combined for obtaining a precise reconstruction.

J. Yang et al. in "Image Super-resolution via Sparse Representation" [18] show the effectiveness of sparsity as a prior for regularizing the SR-problem, which is otherwise ill-posed. In J. Yang et al. "Image Super-Resolution as Sparse Representation of Raw Image Patches" [19], a similar approach is used with uncompressed, and therefore larger, dictionaries.

X. Gao et al. in "Image Super-Resolution With Sparse Neighbor Embedding" [21] discloses image super-resolution with sparse neighbor embedding (SpNE), where first a large number of neighbors is predetermined as potential candidates. Simultaneously, weights for the linear combination are estimated. Histograms of oriented gradients (HoG) are used as a descriptor, which work well for local geometry representation. The whole training data set is partitioned into a set of subsets by clustering the histograms of oriented gradients (HoG).

The fast development and popularization of low-cost capturing devices contrast with the proliferation of high definition displays. The applications delivering low resolution images are diverse (e.g. surveillance, satellite) and there is also abundant multimedia content whose resolution is nowadays not up-to-date with current display's capabilities. To fill in this gap, the so called Super-resolution (SR) techniques are used. SR deals with an inverse ill-posed problem which aims to obtain a high-resolution (HR) image from its low-resolution (LR) version by restoring the potential available hidden information. SR approaches can be broadly divided into three different categories: reconstruction based, interpolation based and learning-based methods. The first proposed techniques were the classical multi-image reconstruction-based SR [5,8]. This reconstruction techniques need as a input several images of the same scene with sub-pixel displacements which are used to build a set of linear constraints for the new high resolution pixels intensities. If enough images are provided, the set of equations is determined and can be solved to obtain the high resolution image. This approach, however, depends on the accuracy of the required registration process and is limited to small magnification factors [1,11]. First efforts in interpolation methods used well-known interpolation kernels such as Bilinear or Bicubic [9] which are fast and non-complex but tend to produce overly smooth edges. Further research in interpolation methods exploit natural image priors [4,16] yielding improved results but still having a limited performance when dealing with complex textures. Some of the already mentioned limitations were broken with machine learning SR methods [3,6,7] which aim to learn the relation from LR to HR from a training dataset, usually at a patch level. In [6] the prediction from LR to HR patches is learned through a Markov Random Field and solved by belief propagation. This idea was extended by [15] using primal sketch priors (e.g., edges, ridges and corners). However, this approaches suffer from the need of having large training datasets, in the order of millions of patch pairs, thus being computationally heavy. [3] proposed a manifold assumption where LR and HR manifolds have similar local geometry in two distinct feature spaces. Following this assumption, locally linear embedding (LLE) is used to estimate HR patches by combining the respective HR counterparts of the LR patches found in the training dataset. Recent SR research explored the so called sparsity prior, where LR patches are coded with respect to an over-complete dictionary in order to linearly combine their HR counterparts with the same sparse code [19]. [18] introduced the use of a learnt dictionary pair with a more compact representation of the patch pairs, reducing its size (and as a results also its computational load) compared to previous approaches where dictionaries were a bigger collection of raw patches. The performance of machine learning SR methods depend strongly on the content of the training dataset. In [19], the dictionary is built through sampling raw patches randomly out of a bigger set of images without any concern about the patches being useful to the image to be recovered, and in [18] these raw patches are compressed in a smaller number of patches through sparse coding techniques.

SUMMARY OF THE INVENTION

The present invention discloses a novel sparse SR method which focuses on adaptively selecting optimal patches for the dictionary training. Observing the fact that images usually contain a non-predictable group of different elements with their characteristic textures and edges (e.g. grass, rocks, fur, sand) the invention creates in a training dataset new sub-image entities which we call regions, and descriptors in order to characterize them are extracted. A key idea is that if these regions are smaller, they will have consistent texture or edge content. For every patch to be super-resolved, its texture region is found in the training images by using the efficient local Naive Bayes Nearest Neighbor (NBNN), thus ensuring that in the dictionaries only such example pairs will be included that are highly correlated with the patches to be reconstructed. Furthermore, the invention is not only applicable to the original sparse SR in [19]. Instead, it can rather be applied to all other SR methods that use similar dictionary optimization processes as the one discussed below, such as [13,20].

In principle, a method for performing super-resolution on an input image having low resolution comprises generating a generic training data set of descriptors extracted from regions of training images, and for each patch of the input image, determining a defined number (k) of nearest neighbor regions, extracting example patches from the nearest neighbor regions and collecting the example patches in an example patch data base, determining a combination of low-resolution example patches that, according to their descriptors, optimally approximate the current patch, and constructing a high-resolution patch, wherein a super-resolved image is obtained.

In one embodiment, the method for performing super-resolution on an input image having low resolution comprises generating a generic training data set of descriptors extracted from regions of training images, the training images comprising LR and corresponding HR images, wherein each descriptor comprises a region identifier and a geometrical feature, dividing the input image into a plurality of input image patches, and for each patch of the input image performing steps of determining a defined number k of nearest neighbor regions (with k≥1), the nearest neighbor regions being low-resolution regions from the training data set that have geometrical features that are similar to a current input image patch, extracting example patches from the nearest neighbor region(s) and collecting the example patches in an example patch data base, determining a combination of one or more low-resolution example patches that, according to their descriptors, optimally approximate the current input patch, and constructing a target high-resolution patch from one or more high-resolution patches that correspond to said one or more low-resolution example patches, according to the determined combination.

A super-resolved image is obtained from the target high-resolution patches corresponding to all the input image patches.

In one embodiment, a device for performing super-resolution on an input image having low resolution comprises a training data memory for storing training images and a descriptor data base for storing descriptors, an input image memory and an output image memory, a descriptor extraction unit for generating a training data set of descriptors extracted from patches of training images, the training images being not specific to the input image (generic for several or all images), wherein each descriptor comprises a region identifier and a geometrical feature, a KNN determining unit for determining a defined number k of nearest neighbor regions, the nearest neighbor regions being low-resolution regions of the training data set that are most similar to a current patch according to the descriptors, an example patch extraction unit for extracting a plurality of example patches from said region and collecting the example patches in an example patch data base that is specific for the current input image, a determining unit for determining, when all found example patches are in the example patch data base, a combination of one or more low-resolution example patches from the example patch data base that, according to their descriptors, optimally approximate the current patch, and a patch combiner unit for constructing a high-resolution patch of a super-resolved image from one or more high-resolution patches corresponding to said one or more low-resolution example patches, according to the determined combination, wherein a super-resolved image is obtained. Further, in one embodiment the device comprises a control unit, and an image output unit for providing the super-resolved image. The control unit is for applying the KNN determining unit, example patch extraction unit, determining unit and patch combiner unit to each patch of the input image.

An advantage of the present invention is that it automatically chooses from the training images those regions or windows of interest which are specifically meaningful for a current input image. The invention adapts the content of the training examples to the specific image to be super-resolved, thus providing more meaningful examples.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 HR and LR training images and corresponding descriptors.

DETAILED DESCRIPTION OF THE INVENTION

Figure 1:
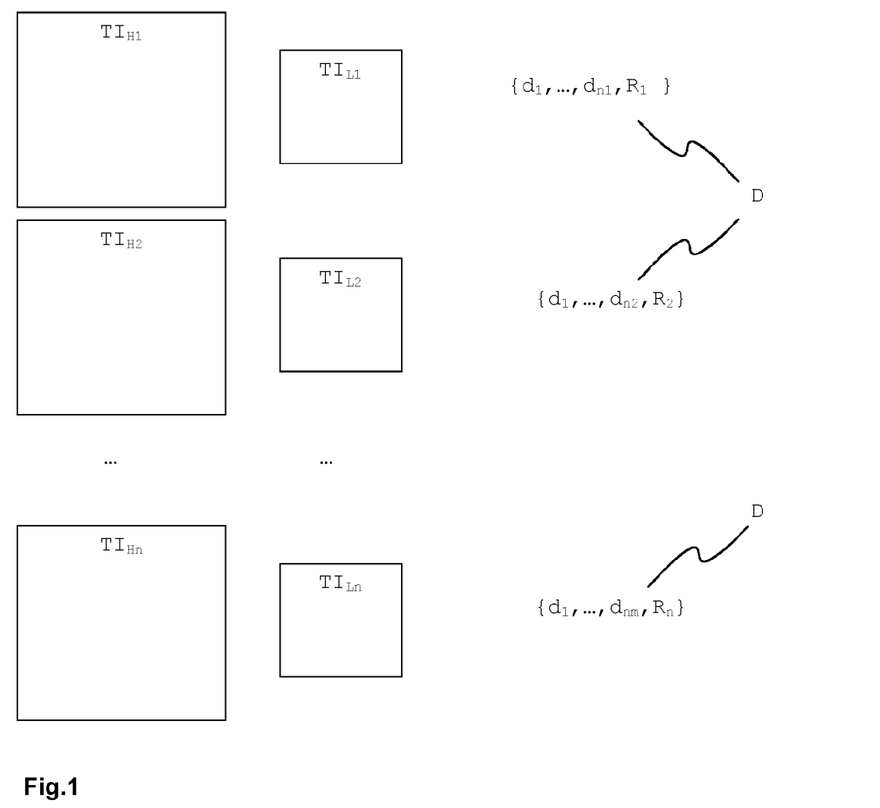

FIG. 1 shows HR and LR training images and corresponding descriptors. The descriptors D are extracted from a set of n HR training images $TI_{H1}$, $TI_{H2}$, ..., $TI_{Hn}$ and/or their corresponding down-sampled LR images $TI_{L1}$, $TI_{L2}$, ..., $TI_{Ln}$. The descriptors comprise several (e.g. in the range of 5-20) geometrical feature descriptors $d_1$, ..., $d_{n1}$. Each image may have its own individual number of geometrical feature descriptors, e.g. the first training image $TI_1$ has n1 geometrical feature descriptors, the second training image $TI_2$ has n2 geometrical feature descriptors etc. Any geometrical feature descriptor may, but needs not, appear in one or more or all descriptors (like e.g., $d_1$). Further, the descriptors D comprise coordinates $x_1$, $y_1$, $x_2$, $y_2$ of a position in the training image where the geometrical features apply (e.g. patch coordinates, whereby the patches may have different sizes), and an identifier $TI_1$, $TI_2$ of the respective training image. From the descriptor D, it is therefore possible to identify a plurality of geometric features, a training image having the geometric features, and an exact position within the training image where the geometric features apply. Various well-known geometric features can be used, e.g. gradients, SIFT, HoG, SURF etc. An advantage of SIFT (scale-invariant feature transform) descriptors is that they show improved resilience to changes in image scale and rotation, and they are robust to changes in illumination, noise and viewpoint. In one embodiment, dense SIFT extraction instead of conventional SIFT is used. This is advantageous when dealing with small patches, such as 3×3 or 5×5. Further, dense SIFT extraction increases the number of features per patch, and thus increases the chance of finding a similar nearest neighbor patch for a given input image patch.

Figure 2:
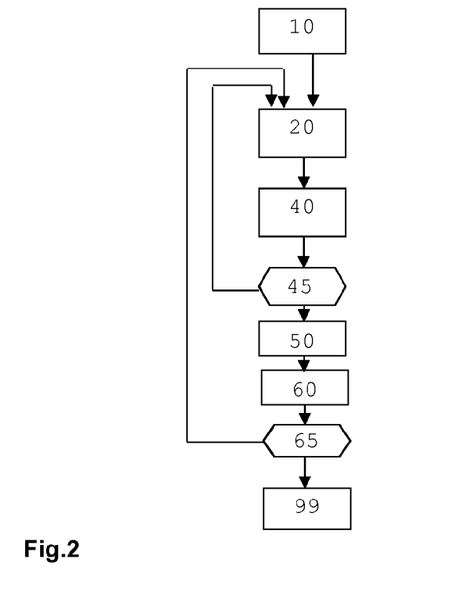
FIG. 2 a flow-chart of a method according to one embodiment of the invention.

FIG. 2 shows a flow-chart of a method according to one embodiment of the invention. In FIG. 2, the method for performing super-resolution on a low resolution input image comprises the following steps:

In a first step 10, a training data set is generated of descriptors extracted from regions of training images. The training images comprise low-resolution and corresponding high-resolution images, wherein each descriptor comprises a region identifier and a geometrical feature (which may appear in a region identified by said region identifier, wherein a region comprises several patches). The input image is divided into a plurality of input image patches and the following steps are performed for each input image patch.

In a second step 20, one or more geometrical features of a current input image patch and a defined number (k) of nearest neighbor regions are determined. The nearest neighbor regions are low-resolution regions of the training data set that have geometrical features that are most similar to the current input image patch (i.e. that are most similar to the current input image patch according to the descriptors).

In a third step 40, a plurality of example patches is extracted (by dense sampling) for each nearest neighbor region, and the example patches are collected in an example patch data base that is specific for the current input image patch. When all input image patches are processed and all found example patches are in stored the example patch data base, for each input image patch a combination of one or more low-resolution example patches from the example patch data base is determined 50 that, according to their descriptors, optimally approximate geometrical features of the current input image patch. Finally, a target high-resolution patch of a super-resolved image is constructed 60 from one or more high-resolution patches corresponding to said one or more low-resolution example patches, according to the determined combination. A control step 55 controls if further patches of the input image need to be processed. The target HR patches constructed for all input patches together form a super-resolved image that is a super-resolved version of the input image and that is output 99.

The determined combination of one or more low-resolution example patches that, according to their descriptors, optimally approximate the current patch, can be determined in an optimization process, which in one embodiment may work e.g. according to $$\min_{\alpha} \|\tilde{D}\alpha - \tilde{y}\|_2^2 + \lambda \|\alpha\|_1 \quad (1)$$

where D is a dictionary, α are weight coefficients for a linear combination, $\tilde{D}\alpha$ is a reconstruction of a patch, and λ is a Lagrange multiplier. Minimizing the expression with respect to a provides the optimized coefficients α. More details are given below.

In one embodiment, a plurality of geometrical features is extracted for each input image patch, whereby each input image patch can have an individual number of geometrical features. Thus, the descriptors can have different size, since they may contain different amounts of features.

The training images are generic for at least several images, i.e. they are not specific to the input image. Therefore the same set of training images can be used for several or all input images. In one embodiment, it is determined if the found nearest neighbor patches are similar enough (i.e. difference between nearest neighbor patches and current input image patch is below a threshold that constitutes a minimum similarity). If the nearest neighbor patches are not similar enough, the example patch data base is increased by adding further examples. In one embodiment, the further examples are taken from a static dictionary. The static dictionary may be generated from the full set of training images, or from predefined parts thereof, or from a set of different additional training images.

In one embodiment, the method comprises a Pre-training and an image specific training, so-called on-line training. For the Pre-training, a dataset of training images is required. The Pre-training comprises the following steps:

Pre-Training
1. Split the training images into square regions of size Lr.
2. Extract descriptors (e.g. SIFT, HoG, SURF) from every image region with dense sampling techniques (i.e. every N pixels).
3. Build a lookup function that retrieves to which region and image a certain descriptor belongs to.
4. Build an efficient search index (e.g. randomized kd forest) whose elements are all the descriptors extracted.

The Pre-training results in a search index that can be used for comparison with given descriptors, and a look-up table that provides the region(s) and image(s) having similar descriptors.

The image specific training (so-called on-line training) requires the following: an input image, the search index of descriptors and the look-up table as resulting from the Pre-training, the dataset of training images, and (in one embodiment) a static dictionary.

Testing & on-Line Training
1. Split input image in rectangular patches of size Lp.
2. Extract descriptors from each patch.
3. For each input image patch, do:
   Local NBNN classification for retrieving a region in a training image End
4. Extract training patches every S pixels from the retrieved regions. In one embodiment, S=1. In one embodiment, S=2. In one embodiment, training patches are retrieved with overlap. Different overlap width can be used, typically e.g. 1 pixel or 2 pixels.
5. Add those patches found in step 4 to a database Xh, and create the corresponding pair low-resolution dictionary Xl with downsampled version of the patches.
6. The result is a trained coupled dictionary, similar as in [1], but specifically trained for the input image.
7. Find the sparse combination of each low-resolution input image patch with the low-resolution dictionary, and use it to obtain the high resolution image patch.
8. If results are not satisfying, concatenate the adaptive trained dictionary above (in step 4) with the static dictionary (both in low and high resolution), and repeat step 7.

The Testing & on-line training stage will, in principle, be repeated for each input image, while the look-up table and search index provided by the Pre-training stage is generic and can be used for several or all input images. Thus, the Pre-training stage is required only once.

The present invention can be applied to all those methods which use sparse coding techniques or one-time trained dictionaries.

Figure 3:
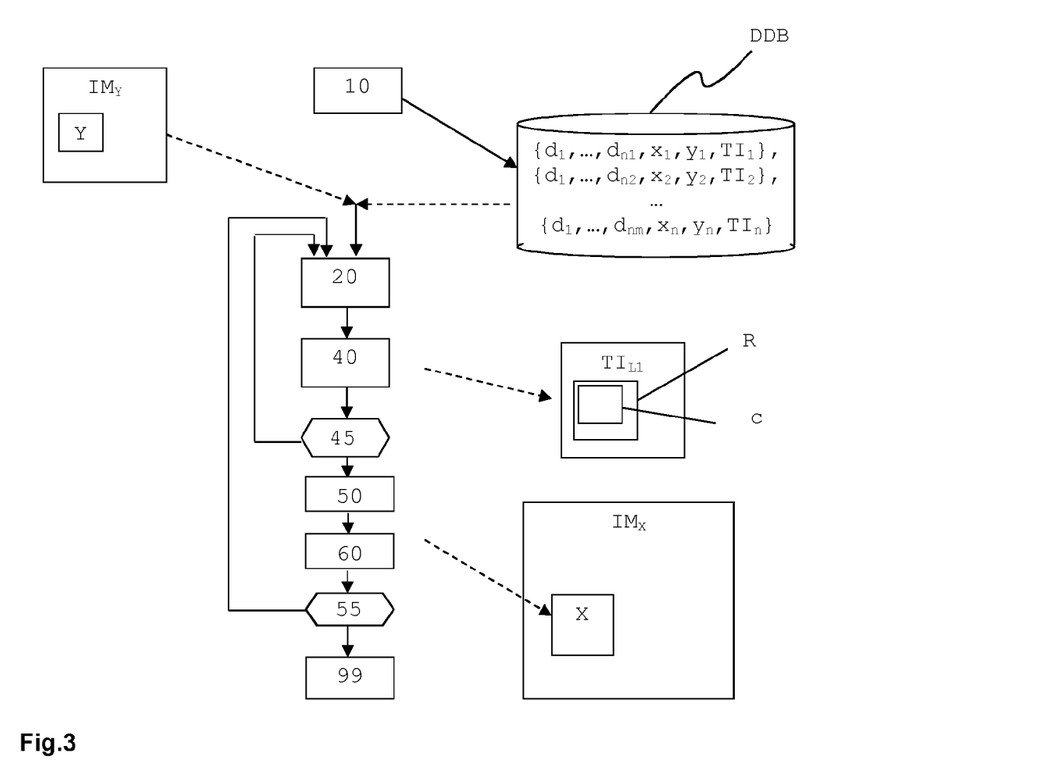
FIG. 3 an enhanced flow-chart of a method according to one embodiment of the invention.

FIG. 3 shows, in an enhanced flow-chart of a method according to one embodiment of the invention, how the above-mentioned method steps are related to an input image $IM_Y$ and output image $IM_X$, a descriptor data base DDB, example data base XDB and a region R. Geometric features of a current input image patch Y are compared with the geometric features within descriptors stored in the descriptor data base DDB. From the descriptors in the descriptor data base, the k regions (e.g. k=1) that have the best matching features $d_1, \ldots, d_n$ is/are determined, and the respective coordinates x,y and source training image/images TI is/are extracted from the example data base XDB. In one embodiment, the predefined number k of nearest neighbor regions is one of 1, 2, 3 and 4. The coordinates x,y refer to any defined point in the nearest neighbor region, e.g. its center, upper left corner etc. Each nearest neighbor region is separated into example patches, which are then stored in the example data base XDB.

Figure 4:
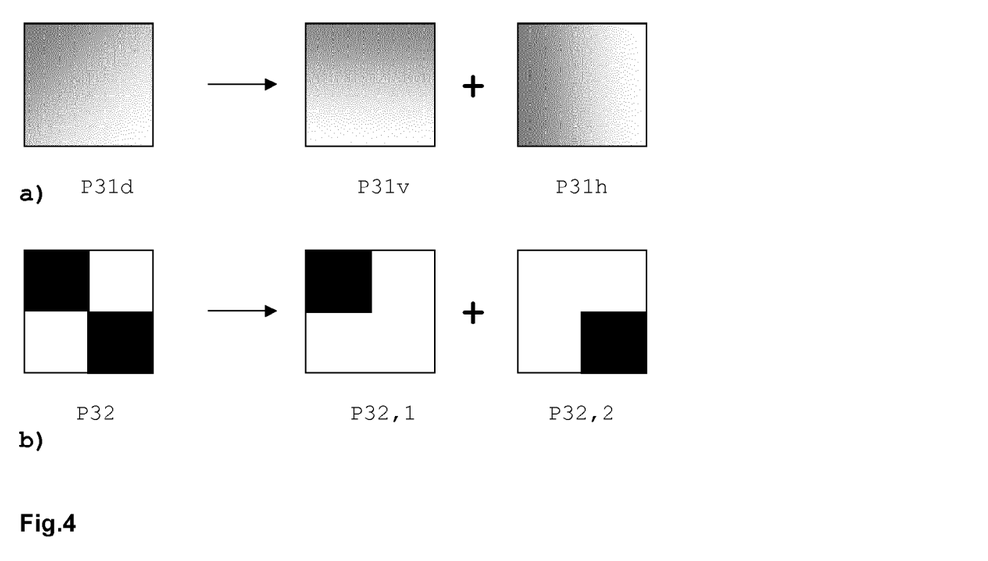
FIG. 4 exemplary combination of patches.

FIG. 4 shows exemplarily how patches are combined.

In FIG. 4 a), an input image patch P31d has a diagonal gradient. A first example patch P31v with vertical luminance gradient and a second example patch P31h with horizontal luminance gradient are linearly combined to obtain a patch that has a diagonal gradient, which is in this example most similar to the input image patch. E.g. the linear combination can be according to $$P31=a1*P31v+a2*P31h$$

with coefficients a1,a2 to be determined. This is done in the step of determining 50 a combination of one or more low-resolution example patches from the example patch data base that, according to their descriptors, optimally approximate the current patch. For example, for the patches shown in FIG. 4 a), the coefficients may be a1=a2=0.5.

In FIG. 4 b), a first example patch P32,1 and a second example patch P32,2 are linearly combined to obtain a patch P32 that is most similar to a particular input image patch P32. E.g. the linear combination can be simply according to $$P32=P32,1+P32,2$$

Although in the above examples two example patches are linearly combined, the same principle can be applied for combining more than two example patches. Further, two or more example patches can be combined in a non-linear way.

Figure 5:
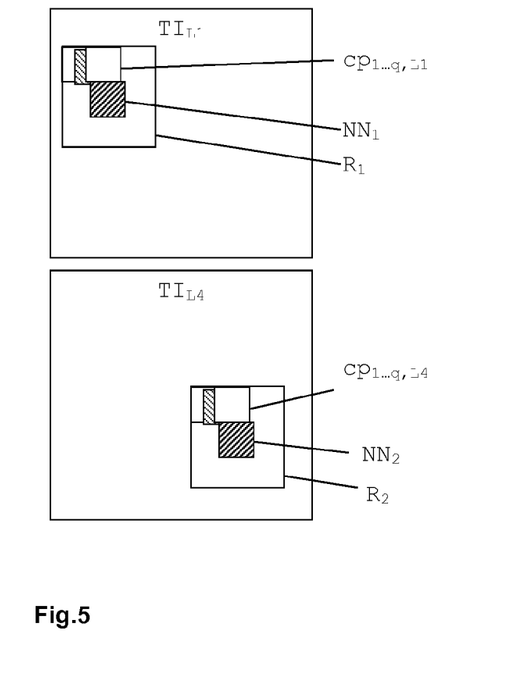
FIG. 5 example patches obtained from search windows in different training images.

FIG. 5 shows how example patches are obtained from regions in different training images. In this embodiment, the LR training images are used for searching example patches, and k=2. In a first training image $TI_{L1}$, one of the k nearest neighbor regions $R_1$ of a given input image patch was found. In a second training image $TI_{L4}$, the second nearest neighbor region $R_2$ with respect to the input image patch was found. Both regions $R_1$, $R_2$ are densely sampled to obtain example patches, which later serve as candidate patches. E.g. the nearest neighbors $R_1$, $R_2$ were found in the first and fourth training images $TI_{L1}$, $TI_{L4}$, and first example patches $cp_{1, \ldots, q,L1}$ are obtained from the first region $R_1$ of the first training image $TI_{L,1}$, and second example patches $cp_{1, \ldots, q,L2}$ are obtained from the second region $R_2$ that is within the fourth training image $TI_{L,4}$. In one embodiment, the same number q of example patches is obtained from each search window in all training images. It is generally possible that more than one nearest neighbor is within one image, and then a training image has more than one region (which may not overlap, in one embodiment). However, it is preferable that regions do not overlap, since otherwise example patch data may be stored twice, which is less effective. In one embodiment, only non-overlapping regions within a training image are allowed.

Figure 6:
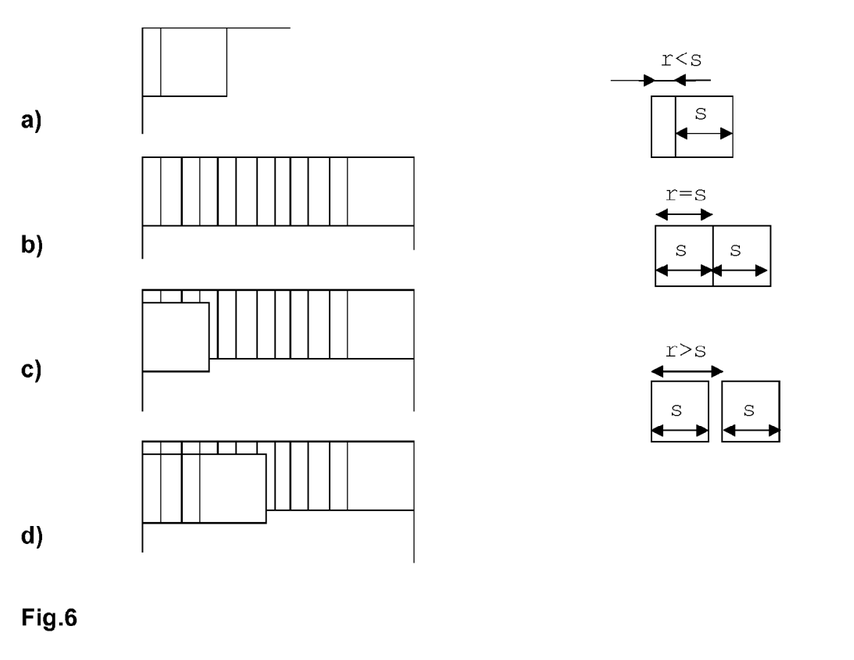
FIG. 6 details of obtaining example patches within a search window.

FIG. 6 shows details of obtaining example patches within a region. Dense sampling within the region is used, i.e. in regular intervals of every r pixels ($r_h$ in horizontal and $r_v$ vertical direction, may be equal or different) an example patch is extracted. The parameter r can be considered as controlling patch overlap, which is s-r (assuming patch length/height of s pixels). The example patches within a region need not necessarily overlap. There may even be a gap between the example patches (r>s). In one embodiment, the parameter r is constant and predefined. In one embodiment, the parameter r is selectable. Together with the patch size (or patch length/height s) and input image size, it has an impact on the resulting amount of example patches for the whole input image. In one embodiment, it is selected such that the resulting total amount of example patches is in a given order of magnitude. In one embodiment, the parameter r is selected such that not more than a given maximum (e.g. 100000, one hundred thousand) example patches are obtained for the complete input image.

In FIG. 6 a), example patch extraction begins with a first example patch in the upper left corner of the region and a second example patch shifted by r to the right. In FIG. 6 b), the upper row is completed. In FIG. 6 c), further example patches are extracted from a new row with vertical shift, proceeding as in FIG. 6 d). As mentioned above, horizontal shift and vertical shift may differ from each other, and example patches need not be overlapping.

Figure 7:
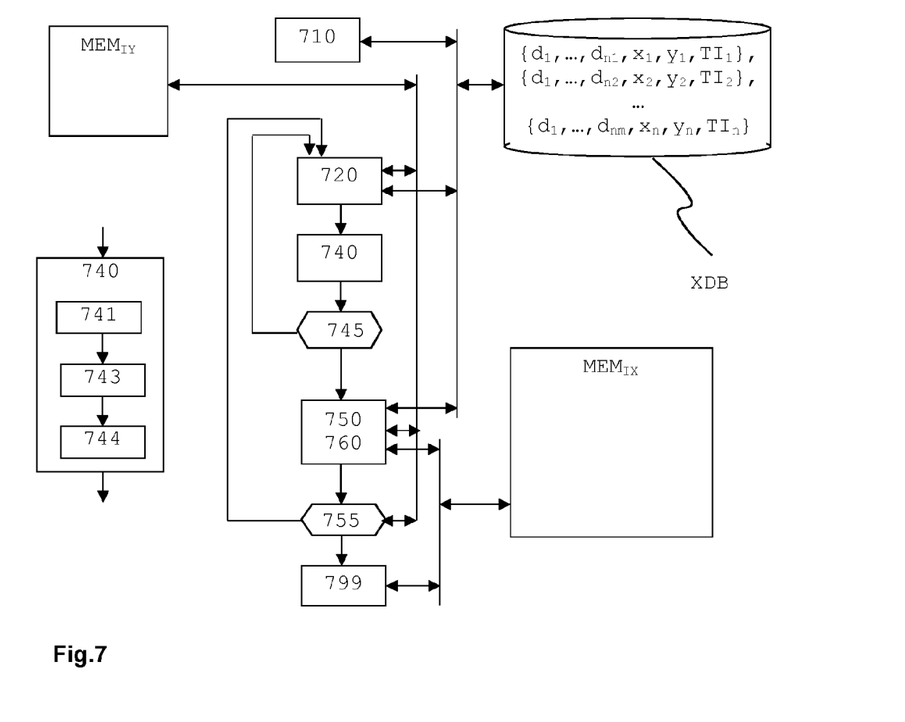
FIG. 7 modules of a device according to one embodiment of the invention.

FIG. 7 shows modules of a device according to one embodiment of the invention. Some of all of the modules may be implemented by one or more processors or processing units, or by software being run on one or more processors or processing units. Memories may be implemented by storage units such as RAM, Flash or HDD connected to the processors or processing units. In FIG. 7, a device for performing super-resolution on an input image having low resolution comprises at least the following modules: a training data memory XDB, an input image memory $MEW_{IY}$ and an output image memory $MEM_{LX}$, a descriptor extraction unit 710, a KNN determining unit 720, an example patch extraction unit 740, a determining unit 750, a patch combiner unit 760 (which can have the determining unit 750 integrated or be separate from the determining unit 750), a control unit 755, and an image output unit 799. The training data memory XDB stores training images and their descriptors.

The descriptor extraction unit 710 generates a training data set of descriptors extracted from patches of training images, wherein the training images are not specific to the input image (i.e. generic for several images, e.g. a given set, or all images). Each descriptor comprises a region identifier, region location, a training image identifier and a geometrical feature. The KNN determining unit 720 determines a defined number k of nearest neighbor regions. It comprises a comparison unit CMP that finds a region that has a required feature, or that has a feature most similar to a required feature. The example patch extraction unit 740 extracts a plurality of example patches from the nearest neighbor region, and collects the example patches in an example patch data base that is specific for the current patch. The determining unit 750 determines, when all found example patches are in the example patch data base, a combination of one or more low-resolution example patches from the example patch data base that, according to their descriptors, optimally approximate the current input image patch. The patch combiner unit 760 constructs a high-resolution patch of a super-resolved image from one or more high-resolution patches corresponding to said one or more low-resolution example patches, according to the determined combination, wherein a super-resolved image is obtained. The control unit 755 controls that the KNN determining unit 720, example patch extraction unit 740, determining unit 750 and patch combiner unit 760 are applied to each patch of the input image. The image output unit 799 provides the super-resolved image to an output.

The nearest neighbor regions are low-resolution regions of the training data set that according to the descriptors are most similar to a current input image patch, i.e. that optimally match geometrical features of the current input image patch, as further explained below.

In one embodiment, the example patch extraction unit 740 comprises a descriptor extraction unit 741 for extracting, before said determining a defined number k of nearest neighbor regions, descriptors of a current patch, a patch extraction unit 743 for extracting a plurality of example patches from said nearest neighbor region, and a data base construction unit 744 for constructing from said example patches said example patch data base XDB that is specific for the current input image.

In one embodiment, the combination is a linear combination of at least two low-resolution example patches.

In one embodiment, the device further comprises an optimizer unit for optimizing the example patch data base. In one embodiment, a static dictionary is added if the trained dictionary does not provide good results.

Figure 8:
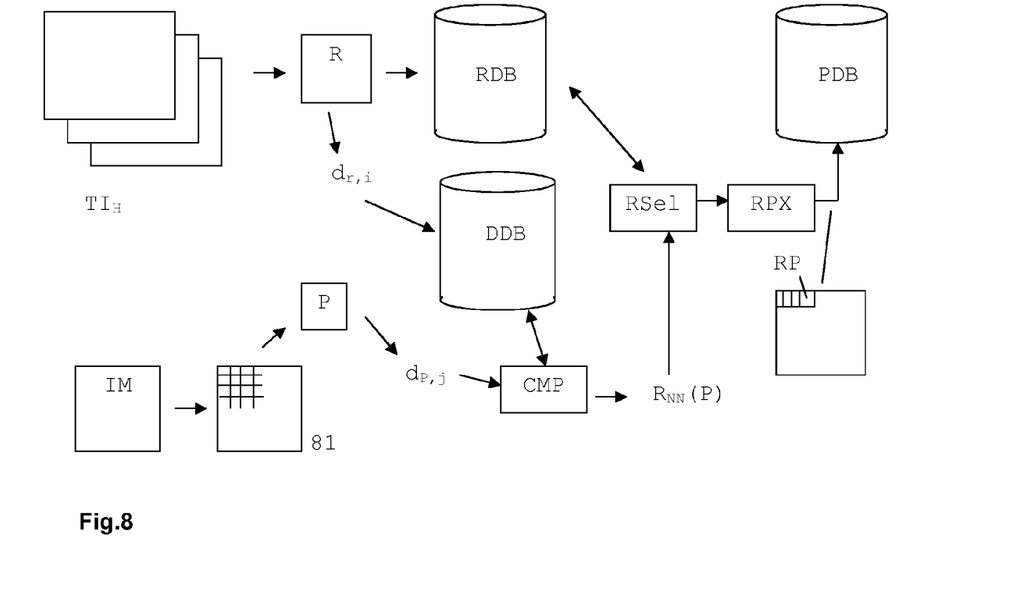
FIG. 8 a general overview.

FIG. 8 shows a general overview of a process and related device units according to one embodiment of the invention. HR training images $TI_H$ are split into regions R that have substantially consistent texture (i.e. the same texture should be within the region). Regions are larger than patches, e.g. 50×50 pixels where patches have 5×5 pixels (for image sizes of e.g. 320×480 or 600×800 pixels). In one embodiment, all regions have same size, while in another embodiment the region size is variable, dependent on image contents (e.g. size of areas with same texture). For each region R, an individual number of descriptors $d_{r,i}$ is extracted and stored in a descriptor look-up table DDB. The regions are stored in a region data base RDB. The descriptor look-up table DDB and the region data base RDB are independent from any input image.

An input image IM is split 81 into patches, and for each patch P an individual number of descriptors $d_{P,j}$ is extracted. These descriptors are compared in a comparison unit CMP (as included in the KNN determining unit 720) with descriptors of the regions, and the k nearest neighbour regions $R_{NN}(P)$ are detected. In one embodiment, k=1. A region selection unit RSel selects the corresponding region from the region data base RDB, and a region patch extraction unit RPX (as included in the example patch extraction unit 740) extracts patches ("region patches") RP from the region. These are used as example patches, and stored in a patch data base PDB. In one embodiment, the region patches RP are overlapping. The region patches RP have same size as the input image patches P, in one embodiment.

After this procedure has been completed for all input image patches P, the patch data base PDB comprises all patches that are most relevant for performing example-based super-resolution of the input image IM. Advantageously, this patch data base is optimized for the current input image IM and much smaller than a conventional patch data base that would be constructed from all patches of all training images. Therefore, the patch data base is dramatically reduced, and the super-resolution yields a much better result, wherein even less processing power is required. The region size, patch size and example patch overlap can be used as parameters to control how many patches the patch data base PDB contains.

Figure 9:
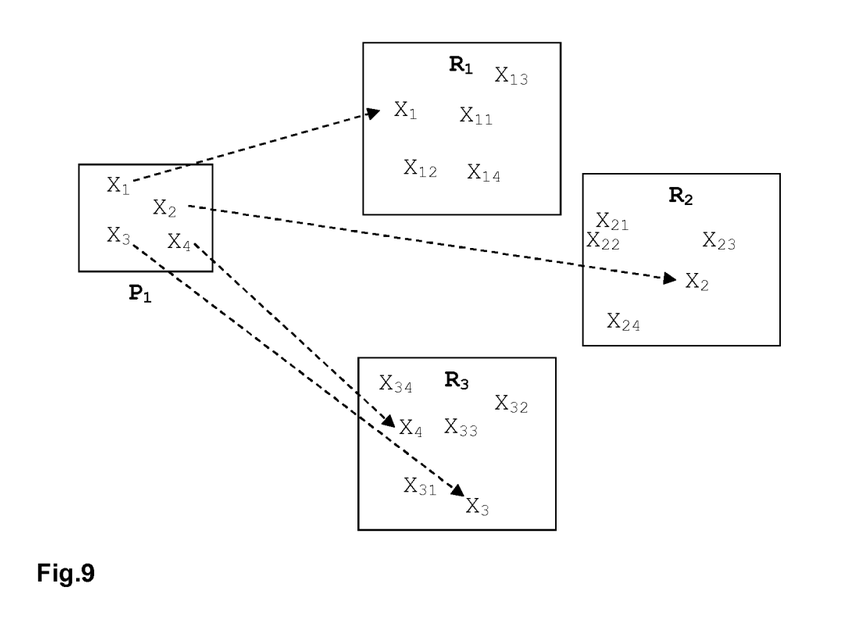
FIG. 9 a schematic of exemplary feature mapping in regions and patches.

FIG. 9 shows how regions and geometrical features are used. In an input image patch $P_1$, four geometrical features $X_1, X_2, X_3, X_4$ are detected. For each of the features, the comparison unit CMP finds a region that has the feature, or that has the most similar feature. E.g. a feature $X_1$ is found in a first region $R_1$, a second feature $X_2$ is found in a second region $R_2$, and third and fourth features $X_3, X_4$ are found in a third region $R_3$. Then, these three regions $R_1, R_2, R_3$ are split into example patches $X_{11}, \ldots, X_{34}$, which are then stored in the patch data base PDB, as described above. The feature extraction and comparison operate in the LR domain. In one embodiment, they use down-sampled HR training image regions. In one embodiment, they use HR training image regions that are down-sampled and re-scaled to their previous size, so that they are blurred versions of the original regions.

The present invention discloses a novel sparse SR method which focuses on adaptively selecting optimal patches for the dictionary training. Observing the fact that images usually contain a non-predictable group of different elements with their characteristic textures and edges (e.g. grass, rocks, fur, sand), new sub-image entities which are called regions are created in the training dataset, and descriptors are extracted in order to characterize the regions. One key idea is that since these regions are smaller than complete images (as used in the prior art), they will have consistent texture or edge content. For every patch to be super-resolved, its texture region is found in the training images by using the efficient local Naive Bayes Nearest Neighbor (NBNN) relationship, which ensures that in the dictionaries only such example pairs will be included that are highly correlated with the patches to be reconstructed. Furthermore, the disclosed method is not only applicable to the original sparse SR [19], but it can rather be applied to all other SR methods that use similar dictionary optimization processes as the one discussed above.

The following describes the sparse representation approach to super-resolution. The core idea of sparse signal representation is that linear relationships between signals can be precisely reconstructed from their low-dimensional projections. The application of sparse signal representation to SR was firstly proposed by [19] and has been a very active research topic since then [13,18,20]. In the following, a brief presentation of the method is provided.

Let X be a HR image from which patches x are extracted and Y a LR image from which patches y fulfilling the following reconstruction constraint are extracted:

$$Y=(H(X))\downarrow \qquad (1)$$

with $(\ )\downarrow$ being a decimator operator and $H(\ )$ a transfer function modeling modifications to the pixel values (e.g. blur). Recovering X from Y stays an ill-posed problem since many HR images comply with eq. (1). For a given Y, sparse SR approaches solve this ill-posed problem by assuming the so called sparsity prior:

$$x \approx D_h\alpha \text{ for some } \alpha \in \mathbb{R}^K \text{ with } \|\alpha\|_0 << K \qquad (2)$$

where $\alpha$ will be the sparse representation with reduced non-zero entries (<<K). To recover HR patches x, the sparse representation $\alpha$ will be calculated from LR patches y with respect to a dictionary $D_l$ and using a feature transformation F.

$$\min\|\alpha\|_0 \text{ so that } \|FD_l\alpha - Fy\|_2^2 \leq \epsilon \qquad (3)$$

This optimization problem can be solved with Lagrange multipliers with the equivalent formulation proposed by [19]:

$$\min_\alpha \|FD_l\alpha - Fy\|_2^2 + \lambda\|\alpha\|_0 \qquad (4)$$

where the regularization parameter λ provides a trade-off between the sparsity and accuracy of the solution found. Since patches extracted from an image are commonly sampled with a certain overlap, the optimization problem in eq. (4) needs to be redefined in such a way that adjacent patches are compatible:

$$\min_\alpha \|\tilde{D}\alpha - \tilde{y}\|_2^2 + \lambda\|\alpha\|_0 \text{ where } \tilde{D} = \begin{bmatrix} FD_l \\ PD_h \end{bmatrix} \quad (5)$$

$$\text{and } \tilde{y} = \begin{bmatrix} Fy \\ w \end{bmatrix},$$

with P being the overlap region between the current patch and the previously reconstructed HR image, and w the previously reconstructed values for the overlap region. After solving the optimization problem of eq. (5), the HR patches can be reconstructed by applying the found optimal solution as $x=D_h\alpha^*$.

The following describes dictionary training.

The simplest way to obtain the dictionaries needed for sparse SR is to directly extract raw patches from the training images [19]. By doing so, large dictionaries will be needed which will substantially increase the computational cost of the optimization problem in eq. (5). [18] shows that computation times grow approximately linear to dictionary size. Later work of Yang et al. [18] tackles this problem by using sparse coding techniques to obtain a compact dictionary. The goal of sparse coding is to represent input vectors as a weighted linear combination of a smaller set of basis vectors, extracting high level patterns of the input unlabeled data.

Let $T=[t_1, t_2, \ldots, t_a] \in \mathbb{R}^{w \times a}$ be the training data matrix and $D=[d_1, d_2, \ldots, d_b] \in \mathbb{R}^{w \times b}$ be the dictionary matrix containing all the vector basis. Let $S=[s_1, s_2, \ldots, s_b] \in \mathbb{R}^{b \times a}$ be the coefficient matrix containing the sparse coefficients for all data points T. The coefficient matrix and the dictionary matrix should best approximate X, thus the following objective function will be used:

$$\min_{D,S}\|T-DS\|_2^2 + \lambda\|S\|_1 \text{ so that } \|d_i\|_2^2 \le c, i=1, 2, \ldots b \quad (6)$$

where λ is the regularization parameter, $\|S\|_1$ enforces sparsity of the solution and $\|d_i\|_2^2$ removes scale ambiguity. Formulation in eq. (6) has been broadly studied, and although not being convex in both D and S, it is in one of them if the other is fixed [10]. Consequently, in order to minimize eq. (6), an alternate iterative scheme is used, i.e. updating one variable while the other is fixed.

In SR we will usually have the pair training data matrix $T^h$ and $T^l$ with HR and LR data points respectively. A goal is to train jointly two dictionaries so that the sparse representation of the HR data points is the same as the sparse representation of the corresponding LR data points. These objectives can be formulated as:

$$\min_{\{D_h, D_l, S\}} \frac{1}{N}\|T^h - D_h S\|_2^2 + \frac{1}{M}\|T^l - D_l S\|_2^2 + \lambda\left(\frac{1}{N} + \frac{1}{M}\right)\|S\|_1 \quad (7)$$

where N and M are the dimensions of HR and LR data points respectively.

More details of the disclosed invention are provided below.

The performance of sparse SR methods will highly depend on the content of $D_h$ and $D_l$. Those in turn will be defined by the content of the training examples $T^h$ and $T^l$, thus these subsets are important for the whole SR process. In the work of Yang et al. [19], selecting meaningful training examples was not considered. Instead, they selected training examples randomly out of a dataset of previously cropped images containing only textured zones. Hence, Yang et al. relied on selecting enough diverse patches so that they could generalize for any patch to be super-resolved. The present invention provides an approved approach: it includes a stage which selects adaptively the regions of the training images that better represent each of the input image patches (e.g. fur regions for recovering fur of a tiger), without doing any manual image pre-selection or processing of any kind. A key idea is extracting example pair patches only from the training regions that are likely to contain similar textures to the ones present in the image. By doing so, the training of the dictionary will have a texture-adapted training pair $T^h$ and $T^l$ for each different image. In principle, the training images are split into regions that are then stored, and the further process uses only the regions (not the training images, as in the prior art).

In the following building adaptive dictionaries through NBNN is described.

Each training image $I_T$ is split in square regions R of size $L_R$. Given a patch y, we want to find its training texture region R. If the region prior p(R) is uniform, we will have a maximum likelihood (ML) decision rule:

$$\hat{R}=\mathrm{argmax}_R p(R|y)=\mathrm{argmax}_R p(y|R) \quad (8)$$

Let $\{d^y\}=d_1^y, d_2^y, \ldots, d_n^y$ denote all the descriptors extracted densely from patch y. The Naïve Bayes assumption is used, i.e. descriptors are independent identically distributed:

$$p(y|R)=p(d_1, d_2, \ldots, d_n|R)=\Pi_{i=1}^n p(d_i|R) \quad (9)$$

Applying log probability yields $$\hat{R}=\mathrm{argmax}_R \Sigma_{i=1}^n \log p(d_i|R) \quad (10)$$

This maximum-a-posteriori (MAP) decision requires computing the probability density p(d|R), which can be obtained through the nearest-neighbor (NN) approximation of a Parzen density estimation $p_{NN}(d|R)$, as proposed in [2]. For that purpose, let then $\{d^R\}=d_1^R, d_2^R, \ldots, d_L^R$ be all the descriptors of a region R, where $d_j^R$ is the j-th descriptor.

The Parzen kernel $$K(d-d_j^R) = \exp\left(\frac{1}{2\sigma^2}\|d-d_j^R\|^2\right)$$

yields negligible values for very distant descriptors, since K exponentially decreases with distance.

Therefore, using only the r NN of descriptor d will accurately approximate the Parzen estimation:

$$p_{NN}(d|R) = \frac{1}{l}\sum_{d=1}^r K(d-d_{NN_j}^R) \quad (11)$$

Boiman et al. take the approximation to the extreme of selecting only r=1 as they observed small differences compared to the full Parzen window estimation [2], and in addition it considerably simplifies eq. (10):

$$\hat{R}=\mathrm{argmax}_R \Sigma_{i=1}^n \|d_i - NN_R(d_i)\|^2 \quad (12)$$

Solving eq. (12) requires to calculate the distance from the patch to all existing regions in the training dataset. This might be computationally prohibitive since usual training sets can contain hundreds of images which translates in a number of regions in the order of thousands. Recent research in NBNN classifiers proposed local NBNN [14] which seizes this problem by only including in the posterior probability estimates the categories (i.e. regions) in the local neighborhood of the descriptors. The runtime grows with the log of the number of categories rather than linearly as in [2]. This results in sensitive a speed-up for high number of categories (results in [14] show a 100× speed-up for 256 categories) while still outperforming the original method from [2] in classification accuracy. In the present invention, the algorithm described in [2] is used not for finding nearest neighbor images, but nearest neighbor regions.

Let R be some region and $\overline{R}$ the set of all other regions. If we reformulate the NBNN updates as adjustments to the posterior log-odds, the alternative decision rule will be:

$$\hat{R} = \operatorname{argmax}_R \sum_{i=1}^{n} \log \frac{P(d_i \mid R)}{P(d_i \mid \overline{R})} + \log \frac{P(R)}{P(\overline{R})} \quad (13)$$

Again, the prior can be dropped if we assume uniform region priors. The benefit of this alternative formulation as log-odds increments is that we can select the region posteriors which give a positive contribution on the sum in eq. (13). Major contributions of local NBNN comprise (a) only using the closest member from the regions whose descriptors are within the k nearest neighbors of each $d_i^y$, and (b) modeling the distance to the rest of the regions $P(d_i|\overline{R})$ as the distance to the k+1 nearest neighbors.

A more compact explanation of the algorithm is shown below (Algorithm 1):

---

Algorithm 1 ADAPTIVETRAINING(Y,R)

---

Require: A Nearest Neighbor index containing all descriptors from all regions, queried by NN(d,#neighbors).
Require: Region lookup function REGION(descriptor) that retrieves the region to which descriptor belongs to.
Require: Sampling patches function SAMP-PATCHES(Region) which extracts patches with a certain overlap.
    for all patches y ∈ Y do
        for all descriptors $d_i$ ∈ y do
            {$p_1, p_2, \ldots, p_{k+1}$} ← NN($d_i$,k+1)
            for all region R found in the k nearest neighbors do
                $dist_R = \min_{\{p_j | REGION(p_j)\}} \|d_i - p_j\|^2$
            end for
            totals[R] ← totals [R] + $dist_R$ − $dist_B$
        end for
        Selected[y] ← $\operatorname{argmin}_R$totals[R]
    end for
    for all Selected unique regions do
        T ← SAMPPATCHES (Selected[R])
    end for
    return T

---

After finding a region R for every patch y, patches of size $L_p$ are sampled with a certain overlap inside the selected regions and are included in HR and LR training data matrices $T^h$ and $T^l$. These are used for training the sparse dictionaries and the sparse SR recovery, as described above.

The following describes how, in some embodiments, regions can be rejected. Some regions extracted from the training images might be not useful, since they do not contain high-frequency information. These are e.g. blurry unfocused backgrounds, uniform colors etc. In order to reject these regions, every region is filtered with a high-pass filter whose cut-off frequency is related to the magnification factor MF by $$f_c = 1 - \frac{1}{MF},$$

thus intuitively requiring higher frequency content when higher magnification orders are used. The energy per pixel is computed in the filtered region, defined as $E=\|R'\|_2^2/L_R^2$. A given region R is rejected when its energy E, as compared with a manually selected threshold ξ, is too low: E<ξ.

The following provides more information about image descriptors.

Many feature representations have been proposed in the literature trying to boost SR. Freeman et al. [6] used a simple high-pass filter in order to obtain the LR patch information closer in frequency to the one to be predicted in the HR patch. Later, Sun et al. [15] used Gaussian derivative filters also to extract the HF information of the LR patches. In the same direction, Chang et al. and Yang et al. used concatenated first- and second-order gradients [19]. In contrast to that, the present invention uses three different type of descriptors for three different tasks:

1. First- and second-order gradients as a $F_l$ feature transform for $D_l$.
2. Centered luminance values. In $D_h$ there is a constraint for the descriptors to be easily reversible to pixel values. In this feature representation, the mean of the patch's luminance is subtracted from every luminance value (i.e. eliminating DC component from the patch). Although keeping the same descriptors as in $D_l$ would be desirable to make a more consistent descriptor space, a reversion step is not feasible for gradient descriptors.
3. Dense SIFT descriptors as in [12] can be used for the region selection stage. SIFT descriptors show improved resilience to changes in image scale and rotation, and are robust to changes in illumination, noise and viewpoint. In one embodiment, dense SIFT extraction is used instead of the original SIFT detector, since small patches are dealt with and a certain number of features per patch needs to be forced.

While there has been shown, described, and pointed out fundamental novel features of the present invention as applied to preferred embodiments thereof, it will be understood that the present invention has been described purely by way of example. Various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention.

As will be appreciated by one skilled in the art, aspects of the present principles can be embodied as a system, method, device or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "block," "module", or "system." Furthermore, aspects of the present principles can take the form of a computer readable storage medium. Any combination of one or more computer readable storage medium(s) may be utilized.

REFERENCES

[1] S. Baker and T. Kanade, "Limits on super-resolution and how to break them", IEEE Trans. on Pattern Analysis and Machine Intelligence, 24(9):1167-1183, 2002

[2] O. Boiman, E. Shechtman, and M. Irani, "In defense of nearest-neighbor based image Classification", pages 1-8, 2008. ISSN 1063-6919. doi: 10.1109/CVPR.2008.4587598

[3] H. Chang, D. Yeung, and Y. Xiong, "Super-resolution through neighbor embedding", Proc. IEEE Conf. on Computer Vision and Pattern Recognition, pages 275-282, 2004

[4] Shengyang Dai, Mei Han, Wei Xu, Ying Wu, and Yihong Gong, "Soft edge smoothness prior for alpha channel super resolution", 2007

[5] S. Farsiu, M. D. Robinson, M. Elad, and P. Milanfar, "Fast and robust multiframe super-resolution", IEEE Trans. on Image Processing, 13(10):1327-1344, 2004

[6] W. T. Freeman, E. C. Pasztor, and O. T. Carmichael, "Learning low-level vision", Int. J. Computer Vision, 40(1): 25-47, 2000

[7] W. T. Freeman, T. R. Jones, and E. C Pasztor, "Example-based super-resolution", IEEE Comp. Graph. Appl., 22(2):56-65, 2002

[8] M. Irani and S. Peleg, "Improving resolution by image registration", CVGIP: Graph. Models Image Processing, 53(3):231-239, 1991

[9] R. Keys, "Cubic convolution interpolation for digital image processing", Acoustics, Speech and Signal Processing, IEEE Transactions on, 29(6):1153-1160, 1981. ISSN 0096-3518. doi: 10.1109/TASSP.1981.1163711

[10] Honglak Lee, Alexis Battle, Rajat Raina, and Andrew Y. Ng, "Efficient sparse coding algorithms", pages 801-808, 2007

[11] Z. Lin and H.-Y. Shum, "Fundamental limits of reconstruction-based superresolution algorithms under local translation", IEEE Trans. on Pattern Analysis and Machine Intelligence, 26(1):83-97, 2004

[12] David G. Lowe, "Distinctive image features from scale-invariant keypoints", Int. J. Computer Vision, 60(2): 91-110, 2004. ISSN 0920-5691

[13] Xiaoqiang Lu, Haoliang Yuan, Pingkun Yan, Yuan Yuan, and Xuelong Li, "Geometry constrained sparse coding for single image super-resolution", Computer Vision and Pattern Recognition (CVPR), 2012 IEEE Conference on, pages 1648-1655, 2012

[14] S. McCann and D. G. Lowe, "Local naive bayes nearest neighbor for image classification", p. 3650-3656, 2012. ISSN 1063-6919

[15] Jian Sun, Nan-Ning Zheng, Hai Tao, and Heung-Yeung Shum, "Image hallucination with primal sketch priors", Computer Vision and Pattern Recognition, 2003 Proceedings, 2003 IEEE Computer Society Conference

[16] Jian Sun, Jian Sun, Zongben Xu, and Heung-Yeung Shum, "Image super-resolution using gradient profile prior", Computer Vision and Pattern Recognition, 2008, CVPR 2008. IEEE Conference on, pages 1-8, 2008. ISSN 1063-6919

[17] Zhou Wang, A. C. Bovik, H. R. Sheikh and E. P. Simoncelli, "Image quality assessment: from error visibility to structural similarity", IEEE Transactions on Image Processing, 13(4):600-612, 2004. ISSN 1057-7149. doi: 10.1109/TIP.2003.819861

[18] J. Yang, J. Wright, T. S. Huang and Y. Ma, "Image super-resolution via sparse representation", IEEE Trans. on Image Processing, 19(11):2861-2873, 2010

[19] Jianchao Yang, J. Wright, T. Huang and Yi Ma, "Image super-resolution as sparse representation of raw image patches", IEEE Conf. on Computer Vision and Pattern Recognition, CVPR., pages 1-8, 2008. ISSN 1063-6919

[20] Kaibing Zhang, Xinbo Gao, Dacheng Tao and Xuelong Li, "Multi-scale dictionary for single image super-resolution", p. 1114-1121, 2012. ISSN 1063-6919. doi: 10.1109/CVPR.2012.6247791

[21] Xinbo Gao, Kaibing Zhang, Dacheng Tao and Xuelong Li, "Image Super-Resolution With Sparse Neighbor Embedding", TIP 2012

The invention claimed is:

1. A method for performing super-resolution on an input image having low resolution, comprising steps of
generating a training data set of descriptors, or retrieving from a storage a previously generated training data set of descriptors, the descriptors being extracted from regions of training images, the training images comprising low-resolution and corresponding high-resolution images, wherein each descriptor comprises a region identifier and a geometrical feature;
dividing the input image into a plurality of input image patches, wherein the patches are smaller than the regions;
for each input image patch, performing the steps of
determining a defined number of nearest neighbor regions, the nearest neighbor regions being low-resolution regions from the training data set that have geometrical features that are most similar to a current input image patch;
from each nearest neighbor region, extracting a plurality of example patches by dense sampling, wherein the dense sampling comprises sampling in regular intervals of r pixels and is independent from the image contents within the region, r being an integer, and collecting the example patches in an example patch data base that is specific for the current input image;
determining from the example patch data base a low-resolution example patch, or a combination of two or more low-resolution example patches, that optimally match geometrical features of the current input image patch; and
constructing a target high-resolution patch from one or more high-resolution patches corresponding to said one or more low-resolution example patches, according to the determined combination,
wherein the target high-resolution patches for all input patches form a super-resolved image.

2. The method according to claim 1, wherein for each input image patch the following steps are performed
a. before said determining a defined number k of nearest neighbor regions, extracting descriptors of a current input image patch;
b. after said determining a defined number k of nearest neighbor regions, extracting a plurality of example patches from said nearest neighbor region; and
c. constructing from said example patches said example patch data base that is specific for the current image.

3. The method according to claim 1, wherein in the step of determining a combination of one or more low-resolution example patches from the example patch data base, the combination is a linear combination of at least two low-resolution example patches.

4. The method according to claim 1, wherein the input image patches are overlapping, and the input image patches are rectangular or square.

5. The method according to claim 1, further comprising a step of optimizing the example patch data base after all example patches are in the example patch data base and before said determining a combination of one or more low-resolution example patches.

6. The method according to claim 1, wherein the patches of the input image have a size between 3×3 and 5×5 pixels.

7. The method according to claim 1, wherein said defined number of nearest neighbor patches is k=1.

8. The method according to claims 1, wherein said defined number of nearest neighbor patches is 1<k<5.

9. A device for performing super-resolution on an input image having low resolution, comprising
   a. a training data memory for storing training images and a descriptor data base for storing descriptors;
   b. an input image memory and an output image memory;
   c. a descriptor extraction unit for generating a training data set of descriptors extracted from patches of training images, the training images being not specific to the input image , wherein each descriptor comprises a region identifier and a geometrical feature;
   d. a k-Nearest-Neighbor (KNN) determining unit for determining a defined number k of nearest neighbor regions, the nearest neighbor regions being low-resolution regions of the training data set that are most similar to a current patch according to the descriptors, wherein the patches are smaller than the regions;
   e. an example patch extraction unit for extracting a plurality of example patches from said region by dense sampling, and collecting the example patches in an example patch data base that is specific for the current input image, wherein the dense sampling comprises sampling in regular intervals of r pixels and is independent from the image contents within the region, r being an integer;
   f. a determining unit for determining, when all found example patches are in the example patch data base, a combination of one or more low-resolution example patches from the example patch data base that, according to their descriptors, optimally approximate the current patch; and
   g. a patch combiner unit for constructing a high-resolution patch of a super-resolved image from one or more high-resolution patches corresponding to said one or more low-resolution example patches, according to the determined combination, wherein a super-resolved image is obtained;
   h. a control unit for applying to each patch of the input image the KNN determining unit, example patch extraction unit, determining unit and patch combiner unit;
   i. an image output unit for providing the super-resolved image.

10. The device according to claim 9, wherein the example patch extraction unit comprises
   a. a descriptor extraction unit for extracting, before said determining a defined number k of nearest neighbor patches, descriptors of a current patch;
   b. a patch extraction unit for extracting a plurality of example patches from said region; and
   c. a data base construction unit for constructing from said example patches said example patch data base that is specific for the current patch.

11. The device according to claim 9, wherein the combination is a linear combination of at least two low-resolution example patches.

12. The device according to claim 9, further comprising an optimizer unit for optimizing the example patch data base.

13. The device according to claim 9, wherein the patches of the input image have a size between 3×3 and 5×5 pixels.

14. A device for performing super-resolution on an input image having low resolution, comprising one or more processors and one or more memories, wherein at least one of the one or more memories has stored thereon instructions that when executed on at least one of the one or more processors configure the one or more processors and the one or more memories to comprise
   a. a training data memory for storing training images and a descriptor data base for storing descriptors;
   b. an input image memory and an output image memory;
   c. a descriptor extraction unit for generating a training data set of descriptors extracted from patches of training images, the training images being not specific to the input image , wherein each descriptor comprises a region identifier and a geometrical feature;
   d. a k-Nearest-Neighbor (KNN) determining unit for determining a defined number k of nearest neighbor regions, the nearest neighbor regions being low-resolution regions of the training data set that are most similar to a current patch according to the descriptors, wherein the patches are smaller than the regions;
   e. an example patch extraction unit for extracting a plurality of example patches from said region by dense sampling, and collecting the example patches in an example patch data base that is specific for the current input image, wherein the dense sampling comprises sampling in regular intervals of r pixels and is independent from the image contents within the region, r being an integer;
   f. a determining unit for determining, when all found example patches are in the example patch data base, a combination of one or more low-resolution example patches from the example patch data base that, according to their descriptors, optimally approximate the current patch; and
   g. a patch combiner unit for constructing a high-resolution patch of a super-resolved image from one or more high-resolution patches corresponding to said one or more low-resolution example patches, according to the determined combination, wherein a super-resolved image is obtained;
   h. a control unit for applying to each patch of the input image the KNN determining unit, example patch extraction unit, determining unit and patch combiner unit;
   i. an image output unit for providing the super-resolved image.

15. The device according to claim 14, wherein the example patch extraction unit comprises
   a. a descriptor extraction unit for extracting, before said determining a defined number k of nearest neighbor patches, descriptors of a current patch;
   b. a patch extraction unit for extracting a plurality of example patches from said region; and
   c. a data base construction unit for constructing from said example patches said example patch data base that is specific for the current patch.

16. The device according to claim 14, wherein the combination is a linear combination of at least two low-resolution example patches.

17. The device according to claim 14, further comprising an optimizer unit for optimizing the example patch data base.

18. The device according to claim 14, wherein the patches of the input image have a size between 3×3 and 5×5 pixels.

* * * * *